E. W. LIVELY.
BAKE PAN.
APPLICATION FILED SEPT. 2, 1914.
1,232,939.
Patented July 10, 1917.
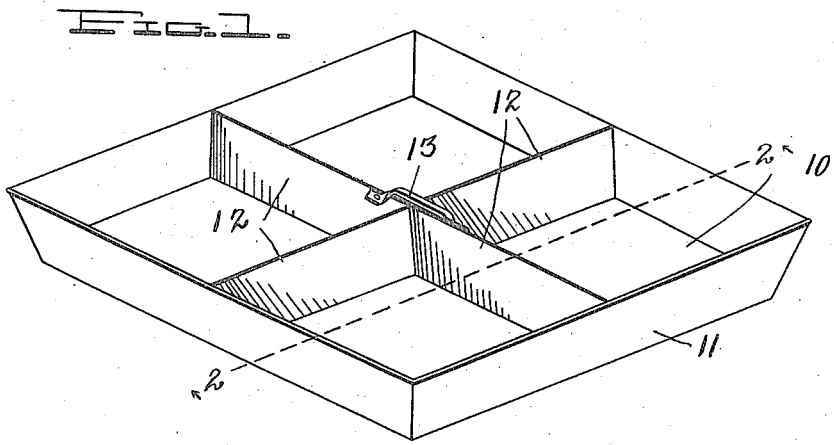
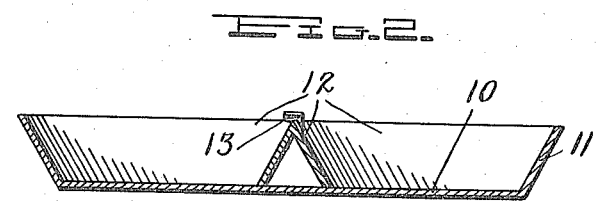
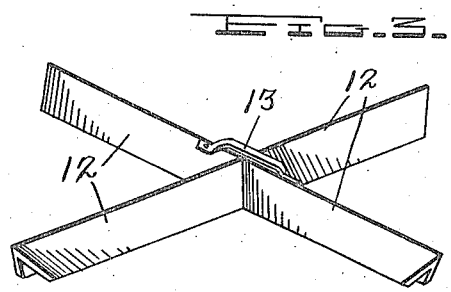
Witnesses
Arthur K. Moore
Harry M. Test
Inventor
E. W. Lively.
By
Attorneys

UNITED STATES PATENT OFFICE.

ELLEN W. LIVELY, OF SALISBURY, NEW HAMPSHIRE.

BAKE-PAN.

1,232,939.     Specification of Letters Patent.     Patented July 10, 1917.

Application filed September 2, 1914. Serial No. 859,901.

*To all whom it may concern:*

Be it known that I, ELLEN W. LIVELY, a citizen of the United States, residing at Salisbury, in the county of Merrimack, New Hampshire, have invented certain new and useful Improvements in Bake-Pans; and I do hereby declare the following to be a full, clear, and exact description of the invention, such as will enable others skilled in the art to which it appertains to make and use the same.

This invention relates to improvements in bake pans, and particularly to a device for use in an ordinary bake pan by means of which a plurality of loaves of bread can be baked so that there will be no raw or crustless sides to any of the loaves.

Another object is to provide a simple device of this character which can be manufactured and sold at a comparatively low cost and which can be readily applied to the ordinary bake pan.

Other objects and advantages will be apparent from the following description when taken in connection with the accompanying drawing.

In the drawing:

Figure 1 is a perspective view of a bake pan having my attachment therein.

Fig. 2 is a longitudinal sectional view through the pan and attachment, and

Fig. 3 is a perspective view of the attachment removed from the pan.

Referring particularly to the accompanying drawing 10 represents a bake pan of suitable size and material which has the usual upwardly and outwardly inclined sides 11, and with which my invention is particularly adapted for use.

The attachment comprises a cruciform member each arm 12 of which, in cross section, is in the form of an inverted V. The outer end of each of these arms is downwardly and inwardly inclined so as to fit snugly against the inner inclined face of one of the sides of the bake pan. Secured to the central point of juncture of the arms is a handle 13 by means of which the attachment can be manipulated to readily place the same in the pan or remove it therefrom.

It will be noted that the arms 12 are hollow underneath thus permitting the free circulation of heated air therethrough to properly brown the abutting sides of the loaves of bread. Thus a plurality of loaves can be baked in a single pan, none of which will have a raw or crustless side.

While I have shown the attachment as having four arms, which would divide the pan into four compartments, it will be understood that I may provide less or more arms so as to permit the user to bake fewer or more loaves of bread.

What is claimed is:

An attachment for a bake pan comprising a multi-armed member removably disposed within the pan, the said arms intersecting and being hollow underneath and closed by the bottom of the pan, the outer ends thereof being inclined to fit against the walls of the pan, the said arms having their hollows communicating and a handle member carried by the attachment.

In testimony whereof, I affix my signature, in the presence of two witnesses.

ELLEN W. LIVELY.

Witnesses:
    GEORGE E. BAKER,
    CLYDE C. BROWN.